United States Patent
Soderi et al.

(10) Patent No.: US 9,425,854 B2
(45) Date of Patent: Aug. 23, 2016

(54) SPREAD SPECTRUM SIGNALS IN VEHICLE NETWORK SYSTEMS

(71) Applicant: GENERAL ELECTRIC COMPANY, Schenectady, NY (US)

(72) Inventors: Simone Soderi, Florence (IT); Mario L. Papini, Pontassieve (IT)

(73) Assignee: ALSTOM TRANSPORT TECHNOLOGIES, Levallois Perret (FR)

( * ) Notice: Subject to any disclaimer, the term of this patent is extended or adjusted under 35 U.S.C. 154(b) by 387 days.

(21) Appl. No.: 13/747,507

(22) Filed: Jan. 23, 2013

(65) Prior Publication Data

US 2013/0336367 A1  Dec. 19, 2013

Related U.S. Application Data

(60) Provisional application No. 61/661,239, filed on Jun. 18, 2012.

(51) Int. Cl.
| | |
|---|---|
| H04B 1/707 | (2011.01) |
| B61L 15/00 | (2006.01) |
| B61L 25/02 | (2006.01) |
| B61L 3/12 | (2006.01) |

(52) U.S. Cl.
CPC ............... *H04B 1/707* (2013.01); *B61L 3/121* (2013.01); *B61L 15/0027* (2013.01); *B61L 25/025* (2013.01); *B61L 2003/123* (2013.01); *B61L 2205/00* (2013.01)

(58) Field of Classification Search
CPC .. H04B 1/7117; H04B 1/712; H04B 1/7107; H04B 1/7115; H04B 1/707
USPC ........ 701/400, 408, 412; 370/210, 320, 324, 370/329, 335, 346, 236, 325, 343; 375/130, 375/137, 132, 141, 142, 143, 144, 148; 455/66.1

See application file for complete search history.

(56) References Cited

U.S. PATENT DOCUMENTS

| | | | | |
|---|---|---|---|---|
| 5,691,980 | A | * | 11/1997 | Welles et al. ................. 370/316 |
| 5,801,643 | A | * | 9/1998 | Williams et al. ........ 340/870.02 |
| 6,091,703 | A | * | 7/2000 | Saunders et al. ............. 370/210 |

(Continued)

FOREIGN PATENT DOCUMENTS

| | | |
|---|---|---|
| EP | 1480364 A1 | 11/2004 |
| GB | 2342251 A | 4/2000 |

OTHER PUBLICATIONS

Rainer Hornstein et al., "Critical Demands of Data Transmission between Trains and Trackside Infrastructure", 2005, IFAC.*

(Continued)

*Primary Examiner* — Jelani Smith
(74) *Attorney, Agent, or Firm* — Hahn Loeser & Parks LLP

(57) ABSTRACT

Systems and methods for creating an alternative parallel wireless link communication in addition to wireless signals for a vehicle network. Embodiments of the present invention provide a spread spectrum transmission module that transmits a spread spectrum signal to a wayside equipment module in which such spread spectrum signal is reflected and communicated to a transmission module through an uplink communication. The uplink communication includes a first signal received from the wayside equipment module and the spread spectrum signal.

18 Claims, 8 Drawing Sheets

(56) References Cited

U.S. PATENT DOCUMENTS

| | | | |
|---|---|---|---|
| 6,234,428 B1 | 5/2001 | Bachtiger et al. | |
| 6,532,414 B2* | 3/2003 | Mintz | 701/117 |
| 7,152,347 B2* | 12/2006 | Herzog et al. | 37/195 |
| 7,221,697 B2* | 5/2007 | Sugiura | 375/146 |
| 7,283,580 B2* | 10/2007 | Cumeralto et al. | 375/137 |
| 7,436,801 B1* | 10/2008 | Kanterakis | 370/329 |
| 7,561,002 B1* | 7/2009 | Hariton et al. | 332/109 |
| 8,755,425 B2* | 6/2014 | Morris et al. | 375/141 |
| 2004/0030713 A1 | 2/2004 | Takano et al. | |
| 2005/0128104 A1* | 6/2005 | Karabinis | 340/933 |
| 2008/0030345 A1* | 2/2008 | Austin et al. | 340/572.8 |
| 2008/0076398 A1* | 3/2008 | Mate et al. | 455/414.2 |
| 2010/0232401 A1* | 9/2010 | Hirsch | 370/338 |

OTHER PUBLICATIONS

Madhow et al., "Acquisition in Direct-Sequence Spread-Spectrum Communication Networks", May 1993, IEEE.*

Dedric Carter et al., "Spread Spectrum: Regulation in Light of Changing Technologies", 1998, Massachusetts Institute of Technology.*

European Search Report and Written Opinion issued in connection with corresponding EP Application No. 14152080.9-1852 on Apr. 8, 2014.

* cited by examiner

SPREAD SPECTRUM SIGNALS IN VEHICLE NETWORK SYSTEMS

CROSS-REFERENCE TO RELATED APPLICATIONS

This application claims the benefit of U.S. Provisional Application Ser. No. 61/661,239, filed Jun. 18, 2012. The entirety of the aforementioned application is incorporated herein by reference.

BACKGROUND

1. Technical Field

Embodiments of the subject matter disclosed herein relate to vehicle communication systems.

2. Discussion of Art

Vehicle networks have developed as separate and individual networks during different time periods in which varying technology was implemented. This has resulted in difficulties with interoperability based at least in part upon a disconnect between technological capabilities and each vehicle network. In particular, signaling systems and/or automated control systems between vehicle networks lack compatibility.

BRIEF DESCRIPTION

In one embodiment, a method is provided. The method includes establishing a link communication between a spread spectrum transmitter and an uplink transmitter. The method further includes transmitting a spread spectrum signal with a first signal in an uplink communication between the uplink transmitter and an uplink receiver (e.g., the spread spectrum signal may be transmitted concurrent with the first signal).

In one embodiment, a system is provided. The system includes a balise with an uplink wireless transmitter and a downlink wireless receiver. The system further includes a balise transmission module with a downlink wireless transmitter and an uplink wireless receiver. The balise and the balise transmission module are configured to establish an uplink channel to communicate a first signal and a downlink channel to communicate a second signal. Further in the system, the balise transmission module includes a spread spectrum transmitter that is configured to communicate a third signal to the balise for establishing an additional link channel. The balise is configured to communicate the third signal with the first signal to the balise transmission module with the uplink channel.

In one embodiment, a system is provided. The system includes a transmission module with at least one transmitter and at least one receiver. The system further includes a wayside equipment module with at least one transmitter and at least one receiver. The system further includes that the transmission module communicates with the wayside equipment module. The system further includes a downlink with a wireless transmission from the transmission module to the wayside equipment module. The system further includes an uplink with a wireless transmission from the wayside equipment module to the transmission module. The system further includes a parallel link with a wireless transmission from the transmission module to the wayside equipment module and from the wayside equipment module to the transmission module, a signal associated with the parallel link is combined with a signal for the uplink.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
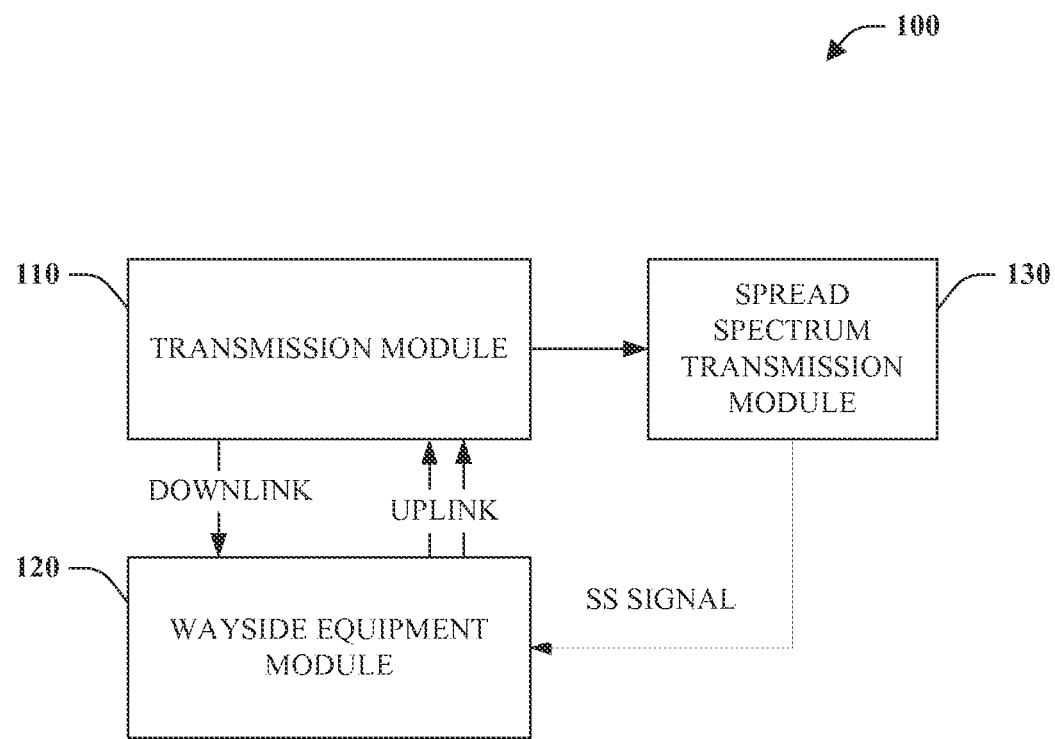
FIG. 1 is an illustration of an embodiment of a system for creating a parallel link communication.

Embodiments of the present invention relate to methods and systems for creating an alternative parallel wireless link communication in addition to wireless signals for a vehicle network. In particular, a parallel wireless link communication is created with a continuous spread spectrum signal in addition to an uplink communication and a downlink communication between a transmission module and a wayside equipment module.

With reference to the drawings, like reference numerals designate identical or corresponding parts throughout the several views. However, the inclusion of like elements in different views does not mean a given embodiment necessarily includes such elements or that all embodiments of the invention include such elements.

The term "vehicle" as used herein can be defined as any asset that is a mobile machine that transports at least one of a person, people, or a cargo, or that is configured to be portable from one location to another. For instance, a vehicle can be, but is not limited to being, a locomotive or other rail vehicle, an intermodal container, a marine vessel, a mining equipment, a stationary portable power generation equipment, an industrial equipment, a construction equipment, and the like.

The term "balise" as used herein can be defined as an electronic beacon or transponder for a vehicle on or near a path for the vehicle.

The term "balise transmission module" as used herein can be defined as at least one of a portion of software, a portion of hardware, or any combination thereof that transmits or receives a wireless signal on-board a vehicle.

The term "wayside equipment" as used herein can be defined as at least one of a portion of software, a portion of hardware, or any combination thereof that transmits a wireless signal to a vehicle or receives a wireless signal from a vehicle (e.g., in either case from a location off board the vehicle).

The term "transmission module" as used herein can be defined as any hardware, software, or combination thereof that can communicate a signal (e.g., wireless signal).

The terms "downlink" and "uplink" (and the various forms thereof) refer to wireless communications from a transmission module to a wayside equipment module or vice versa, respectively. "Telepowering" refers to when the wireless communication from the transmission module to the wayside equipment module can provide electrical power to the wayside equipment module.

The terms "spread spectrum signal" and "third signal" (and the various forms thereof) may be used interchangeably herein and refer to a wireless signal communicated from a spread spectrum transmission module to a wayside equipment module.

FIG. 1 is an illustration of an embodiment of a system 100 for creating a parallel link communication. The system 100 includes a transmission module 110 that communicates with a wayside equipment module 120. For example, the transmission module 110 may be deployed on board a vehicle. The communication between the transmission module can be a wireless communication that includes at least one of an uplink communication (UPLINK) or a downlink communication (DOWNLINK). The downlink communication can be a wireless communication from the transmission module 110 to the wayside equipment module 120, wherein, for instance, the downlink communication telepowers the wayside equipment module. Furthermore, the uplink communication can be a wireless communication from the wayside equipment module to the transmission module.

The system further includes a spread spectrum transmission module 130 that creates a parallel wireless link (e.g., also referred to as "parallel link communication") between the transmission module 110 and the wayside equipment module 120. The spread spectrum transmission module 130 transmits a spread spectrum (SS) signal (also referred to as the "third signal") to the wayside equipment module 120. By way of example and not limitation, the SS signal can be continuously transmitted. The SS signal can be received and reflected by the wayside equipment module 120. The SS signal can be reflected (e.g., transmitted) to the transmission module 110 utilizing the uplink communication. It is to be appreciated that the spread spectrum transmission module 130 can be a separate module (as illustrated), incorporated into the transmission module 110, and/or a suitable combination thereof.

In particular, the SS signal can be reflected and received by the transmission module 110 when within range for the uplink transmitter to reflect. (The uplink transmitter is the portion of the wayside equipment module 120 that is configured to communicate the uplink communication from the wayside equipment module to the transmission module.) In other words, when the transmission module 110 is within a range of the wayside equipment module 120 (for example, by a vehicle on which the transmission module is deployed moving to within the range of the wayside equipment module), the SS signal will be reflected by the wayside equipment module 120 and received by the transmission module 110. Thus, such reflected and received signal can be utilized to identify a location for the wayside equipment module 120. The SS signal is a signal technology that minimizes interference with existing wireless signals (e.g., radio signals or the like), contrary to different types of devices such as inductive transponders (for example), which are subject to interference (e.g., cross-talk or the like).

The uplink communication includes a first signal transmitted from the wayside equipment module to the transmission module. The downlink communication includes a second signal transmitted from the transmission module to the wayside equipment module. Furthermore, the SS signal (third signal) transmitted by the spread spectrum transmission module can be reflected by the wayside equipment module, wherein the SS signal is contributed into the uplink communication. The SS signal can be contributed into the uplink communication alone or in combination with the first signal. The SS signal can be transmitted from the spread spectrum transmission module to the wayside equipment module and reflected from the wayside equipment module to the transmission module to create the parallel wireless link, wherein the SS signal is communicated in the uplink communication with or without the first signal. The SS signal received at the transmission module can designate a location of the wayside equipment module based upon digital signal analysis (discussed in more detail below). The SS signal received at the transmission module within the parallel wireless link is attenuated, wherein such attenuation can be measured (discussed in more detail below).

In one embodiment, inductive transponders provide the uplink communication and/or the downlink communication between the transmission module and the wayside equipment module. However, the uplink communication and the downlink communication may be managed independently, resulting in discontinuity. For instance, a downlink (e.g., telepowering) may not occur for a corresponding uplink (e.g., no transmission from uplink communication). In another example, the telepowering may be delayed, resulting in a delayed transmission of the uplink communication. Moreover, inductive transponders provide low accuracy to identify geographic location between a transmitter and receiver, and are subject to potential cross-talk interference with proximate wireless transmissions and/or signals. The spread spectrum transmission module avoids the above stated aspects that may be present in a system that only includes inductive transponders, by mitigating discontinuity, delay, low accuracy, and the like.

With the spread spectrum transmission module, a parallel link communication is created that enables an alternative communication path for signaling between the transmission module and the wayside equipment module. In other words, the system provides communication for the second signal in the downlink communication as well as communication for the first signal and the SS signal (third signal) in the uplink communication. This parallel link communication minimizes interferences with existing wireless signals as well as provides cross-talk rejection (e.g., rejection of interference from cross-talk). Moreover, the parallel link communication can be leveraged to optimize wireless communication between the transmission module and the wayside equipment module to identify geographic location(s) (discussed in more detail below).

Figure 2:
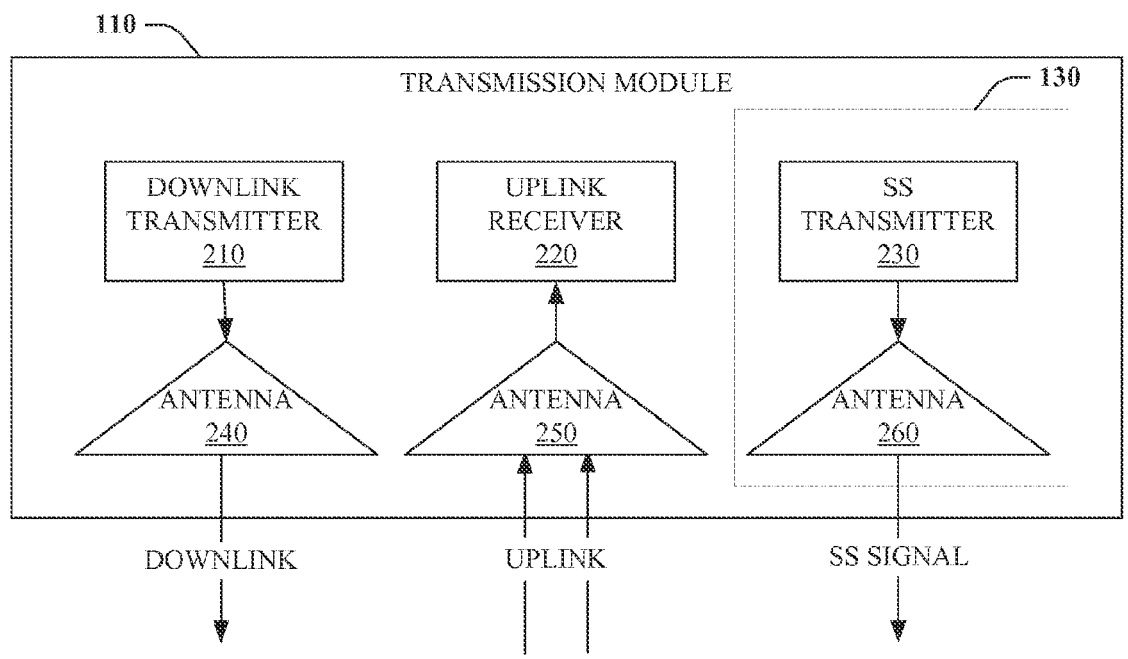
FIG. 2 is an illustration of an embodiment of a transmission module utilized in the system of FIG. 1.

FIG. 2 is an illustration of an embodiment of the transmission module 110. The transmission module includes an uplink receiver 220 and an uplink receiver antenna 250. The uplink receiver can receive a first signal via the uplink receiver antenna 250 from the uplink communication (UPLINK)). Moreover, the uplink receiver can demodulate the first signal received via the uplink receiver antenna 250. Additionally, the transmission module 110 includes a downlink transmitter 210 and a downlink transmitter antenna 240. The downlink transmitter transmits a second signal via the downlink transmitter antenna 240 through the downlink communication (DOWNLINK). The downlink transmitter can modulate the second signal transmitted via the downlink transmitter antenna 240.

The transmission module depicted in FIG. 2 includes the spread spectrum transmission module 130. As discussed, the spread spectrum transmission module can be a separate module, incorporated into the transmission module (as illustrated), and/or a suitable combination thereof. The transmission module and/or the spread spectrum transmission module can include an SS transmitter 230 and an SS transmitter antenna 260. The SS transmitter can transmit a spread spectrum signal (SS signal) via the SS transmitter antenna 260. The transmission module can be a suitable module that communicates a signal. By way of example and not limitation, the transmission module can be an on-board module, on an exterior of a vehicle, on-board a vehicle module, an on-board an asset module, and/or a suitable combination thereof. In another example, the transmission module can be on an exterior of a vehicle, on an exterior of an asset, among others.

The SS signal can be reflected (via the wayside equipment module) to the transmission module through the uplink communication in which the received SS signal can be attenuated. In other words, the uplink communication can include the first signal (e.g., signal from the wayside equipment module to the transmission module) and/or the SS signal (e.g., SS signal from the spread spectrum transmission module to the wayside equipment module and reflected to the transmission module). The combined signal (e.g., the first signal and the third, SS signal) can be separated utilizing Digital Signal Processing Analysis (DSPA) (discussed in more detail below), wherein the separation of the first signal and the SS signal can be utilized to optimize data communication (discussed in more detail below).

In an embodiment, the SS signal can be a Direct Sequence Spread Spectrum signal (DS-SS signal). In another embodiment, the SS signal can be a Frequency Hopping Spread Spectrum (FHSS) signal. In another embodiment, the SS transmitter 230 can continuously transmit the SS signal. In still another embodiment, the SS transmitter can continuously transmit the SS signal such that when any transmission module is proximate to the wayside equipment module (not shown), the SS signal will be reflected and received. For instance, the transmission module can be proximate to the wayside equipment module when an inductive transponder enables wireless communication with at least one of the uplink communication or the downlink communication.

Figure 7:
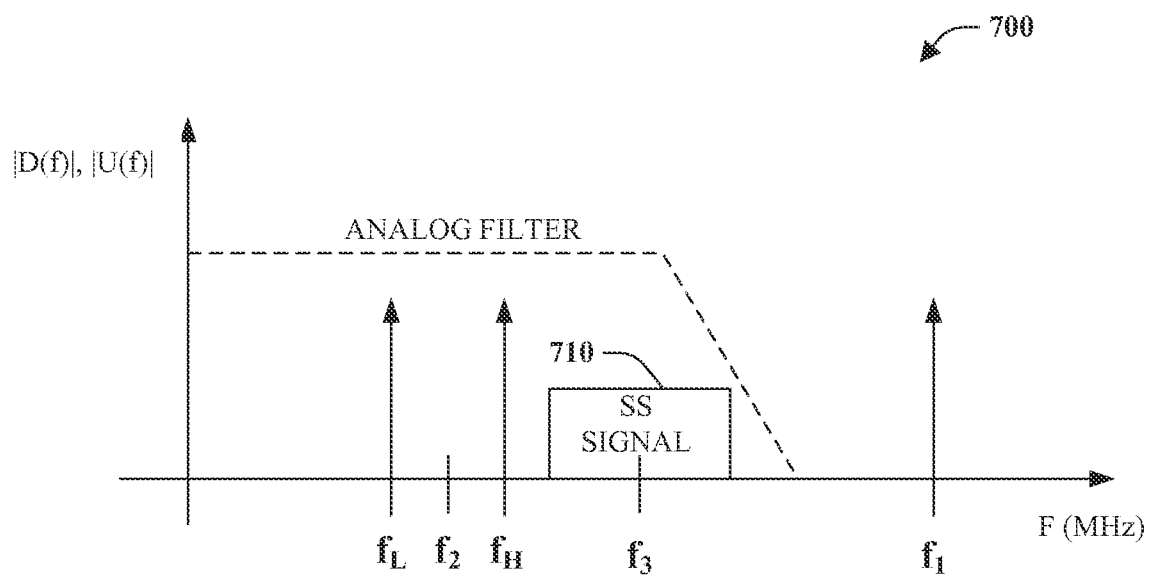
FIG. 7 is a graph of a spread spectrum signal in an uplink band.

By way of example and not limitation, the SS transmitter 230 can include a center frequency. In particular, the center frequency can be a spectrum inside an uplink band (e.g., the uplink communication is within the uplink band). Referring to FIG. 7 briefly, a graph 700 of a spread spectrum signal 710 (SS SIGNAL) in an uplink band is illustrated. The graph depicts the SS signal 710 having a center frequency ($f_3$) that is within the uplink band. This selection of the center frequency allows the SS signal to be reflected from the wayside equipment module to the transmission module utilizing the uplink communication. As illustrated, a downlink communication frequency ($f_1$) can have an amplitude of $A_d/2$. The uplink communication can be centered on a frequency ($f_2$) and can include a low frequency ($f_L$) and a high frequency ($f_H$), wherein each amplitude is $A_u/2$. Thus, the SS signal frequency is selected such that it can be included within the pass bandwidth of a filter (e.g., analog filter) as well as to not interfere with $f_L$, $f_2$, and/or $f_H$.

In an embodiment, the transmission module can be a balise transmission module. In another embodiment, the transmission module can be a balise transmission module on-board a vehicle (e.g., vehicle balise transmission module). In another embodiment, the transmission module can be a balise transmission module on-board a railway vehicle. In another embodiment, the transmission module is associated with a train protection system such as, for example, an Automatic Train Protection (ATP) system, European Train Control System (ETCS), European Rail Traffic Management System (ERTMS), among others.

Figure 3:
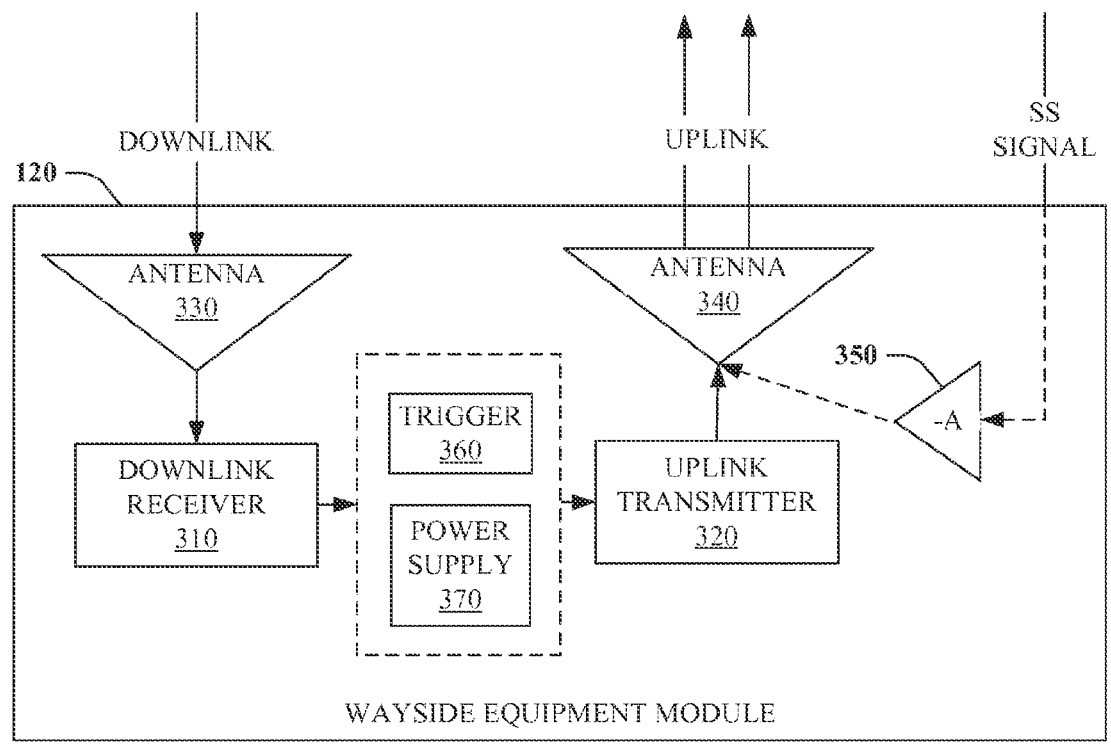
FIG. 3 is an illustration of an embodiment of a wayside equipment module utilized in the system of FIG. 1.

FIG. 3 is an illustration of an embodiment of the wayside equipment module 120. The wayside equipment module is configured to communicate the downlink communication, the uplink communication, and the parallel link communication. In particular, the parallel link communication includes the SS signal received at the wayside equipment module and reflected in the uplink communication with the first signal. The wayside equipment module includes a downlink receiver 310 and a downlink receiver antenna 330 for the downlink communication. The downlink receiver can receive the second signal (DOWNLINK) via the downlink receiver antenna 330, as part of the downlink communication. Moreover, the downlink receiver can demodulate the second signal received via the downlink receiver antenna 330.

The wayside equipment module 120 further includes an uplink transmitter 320 and an uplink transmitter antenna 340. The uplink transmitter can transmit the first signal via the uplink transmitter antenna 340 as part of the uplink communication. Moreover, the uplink transmitter can modulate the first signal transmitted via the uplink transmitter antenna.

The wayside equipment module 120 further includes a trigger 360 and a power supply 370. The power supply can provide power to at least the uplink transmitter 320. In a particular example, the trigger can employ a threshold for an amount of power for at least the uplink transmitter. For instance, if the threshold is met by the downlink receiver (e.g., via telepowering from downlink transmitter), the power supply can power the uplink transmitter.

The SS signal can be received by the wayside equipment module, wherein the SS signal can be modeled with an attenuation "–A" dB (also referred to as a "modeled attenuation 350"). The SS signal is reflected by the wayside equipment module in which the SS signal can be a contribution to the uplink communication in addition to the first signal. In another example, the SS signal is reflected and transmitted without the first signal. Additionally, the receipt of the SS signal can identify a location of the uplink transmitter and, in turn, the wayside equipment module.

In an embodiment, the wayside equipment module 120 can be a balise. In another embodiment, the wayside equipment module can be a wayside equipment for a railway. In another embodiment, the wayside equipment module can be at least one of a switch, a derail, a wayside signal device, a rail connection, a switch power cabinet, a track shunt, a track impedance bond, or an insulated joint. In another embodiment, the wayside equipment module 120 can be a balise placed between rails of a railway as part of a train protection system such as, for example, an Automatic Train Protection (ATP) system, European Train Control System (ETCS), European Rail Traffic Management System (ERTMS), among others. In still another example, the wayside equipment module 120 can be any asset associated a train protection system such as, for example, an Automatic Train Protection (ATP) system, European Train Control System (ETCS), European Rail Traffic Management System (ERTMS), among others.

Figure 4:
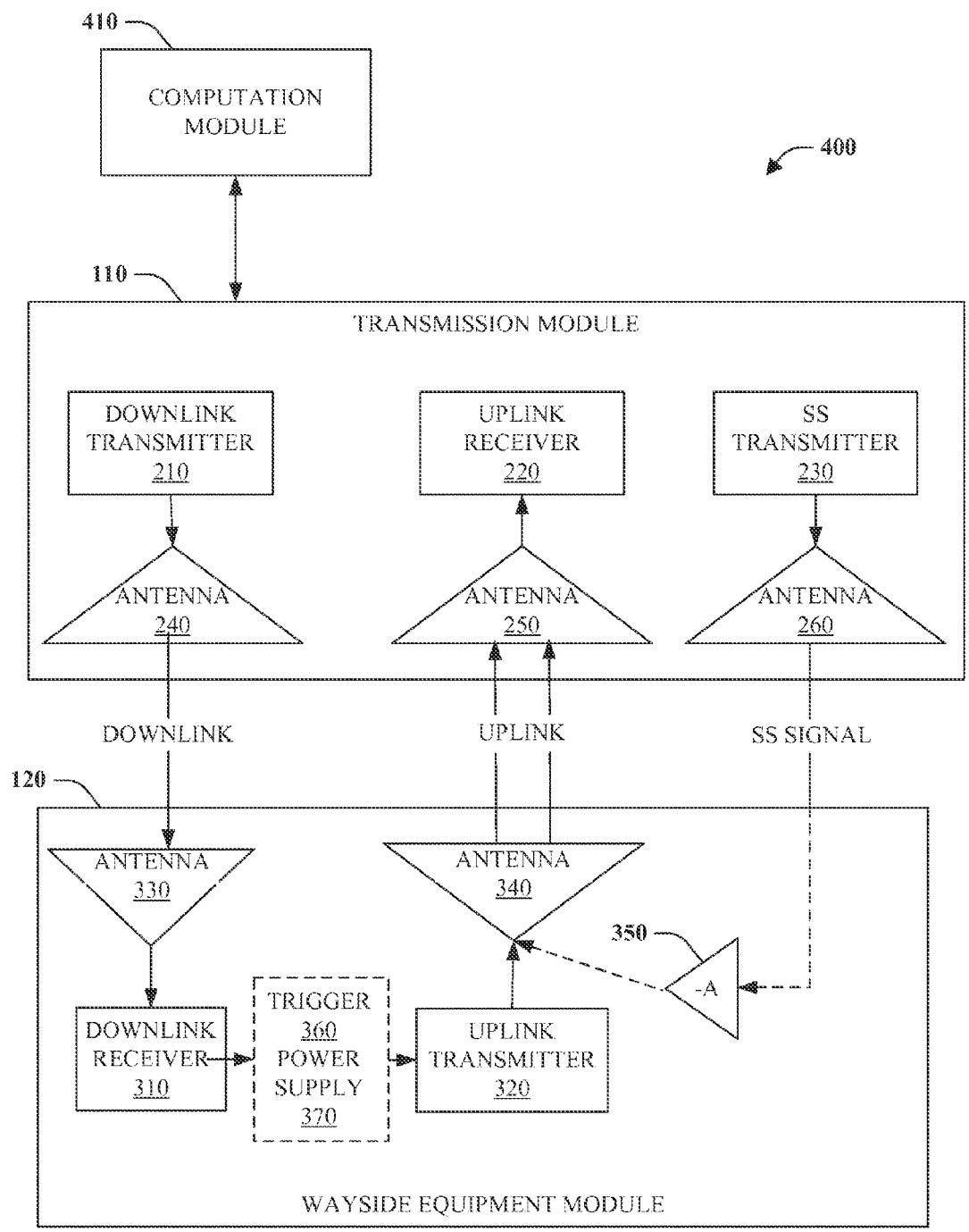
FIG. 4 is an illustration of an embodiment of a system for creating a parallel link communication.

FIG. 4 is an illustration of an embodiment of a system 400 for creating a parallel link communication. The system 400 includes the transmission module 110 that communicates with the wayside equipment module 120 utilizing the downlink communication (DOWNLINK), the uplink communication (UPLINK), and the SS signal. The first signal can be transmitted from the uplink transmitter 320 via the uplink transmitter antenna 340 and received by the uplink receiver 220 via the uplink receiver antenna 250. The second signal can be transmitted by the downlink transmitter 210 via the downlink transmitter antenna 240 and received by the downlink receiver 310 via the downlink receiver antenna 330. Furthermore, the SS signal can be transmitted by the SS transmitter 230 via the SS transmitter antenna 260, reflected by the uplink transmitter antenna 340, and transmitted in the uplink communication with the first signal to the uplink receiver 220 via the uplink receiver antenna 250. In another example, the SS signal can be reflected by the uplink transmitter 320 in the uplink communication without the first signal (e.g., the first signal is not transmitted due to deficiencies in the uplink transmitter, the downlink communication, the trigger, the power supply, or the like).

The system further includes a computation module 410 that can evaluate the signals (from the uplink communication) as well as generate signals (for the downlink communication). In particular, the computation module can include digital signal processing analysis (DSPA) in order to evaluate the first signal, the second signal, and/or the SS signal. The computation module can further control a vehicle based upon the communications. The computation module can be a separate module (as illustrated), incorporated into the transmission module, and/or a suitable combination thereof.

The system can be further configured to process echo signals that occur from the SS signal being reflected from the wayside equipment module. In particular, the echo signal(s) can be utilized by the transmission module to receive a portion of the SS signal. In other words, the SS signal can be received via echoing signals rather than being reflected in the uplink communication. Thus, the SS signal constantly communicating allows use of the SS signal regardless of the frequency selected for such SS signal and/or SS transmitter.

Figure 5:
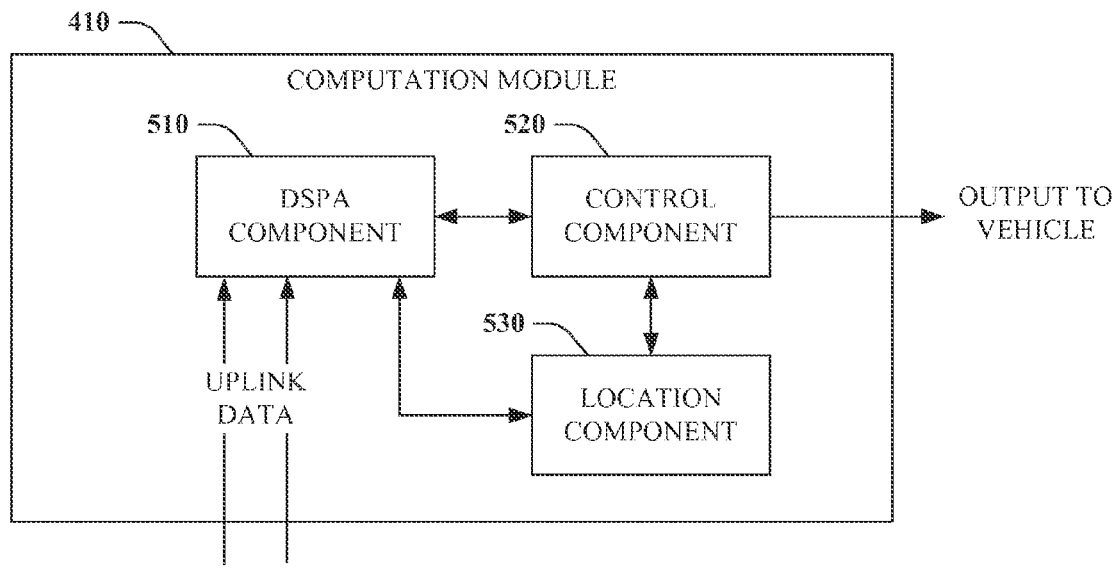
FIG. 5 is an illustration of an embodiment of a computation module utilized in the system of FIG. 4.

FIG. 5 is an illustration of an embodiment of the computation module 410. The computation module includes a Digital Signal Processing Analysis (DSPA) component 510 that employs DSPA for the first signal and/or the SS signal received via the uplink communication. The DSPA component is described in further detail in FIG. 6. A location component 530 utilizes at least one of the first signal or the SS signal to identify a geographic location. In particular, the first signal can be utilized to provide a geographic location or utilized to calculate a geographic location. The location component can further utilize the SS signal to adjust the calculated geographic location. For instance, the receipt of the SS signal can correspond to a location of an uplink transmitter based upon the reflected signal which can provide a more accurate geographic location.

The computation module can further include a control component 520 that provides a control to at least one of a driver of the vehicle (e.g., notification, message, or the like) or the vehicle (e.g., automated control of the vehicle). In general, the control component 520 is configured to output data to a vehicle based upon the location component and/or the DSPA component. By way of example and not limitation, the output can be a notification (e.g., telegram) for a driver. In still another example, the control component can notify a driver with a notification indicating at least one of a geographic location, an indication of an upcoming change in direction for a route, an upcoming change in elevation for a route, an adjustment to a route a vehicle travels, an adjustment to a trajectory (e.g., speed, brake, acceleration, or the like) of a vehicle, and/or an emergency message (e.g., an upcoming issue/problem on a route, a wreck, or the like). In another instance, the output can be a control for a vehicle such as, but not limited to, a speed adjustment, a speed, a brake, an acceleration, etc.

By way of example and not limitation, the communication between the transmission module and the wayside equipment module can be related to identifying a geographic location for a vehicle, wherein the vehicle includes the transmission module on-board and the wayside equipment module is a balise. The SS signal and the first signal can be separated by the computation module 410 by DSPA, wherein the separation of the signals can provide a more accurate identification of the geographic location for the balise and, in turn, the vehicle. For example, the first signal can include geographic location information, yet such information can be inaccurate due to technological deficiencies of inductive transponders (discussed above). The computation module can identify receipt of the SS signal attenuation which corresponds to a location for a balise. Thus, the SS signal can be utilized to adjust the geographic location provided/determined by the first signal. In other words, receipt of the SS signal (reflected and received) can indicate proximity to a balise and thus a location for such balise. The parallel link communication provides geographic location with cross-talk rejection as well as minimal interference with signals in the environment.

Following the above example, the vehicle can include components, instruments, or other on-board assets that may provide interference (e.g., echo signals) with the SS signal. In such a scenario, information regarding the SS signal can be included with the DSPA component in order to facilitate removing or cancelling such interference or echo signal(s). By way of example and not limitation, the interference can be filtered to allow receipt of the SS signal without noise.

Figure 6:
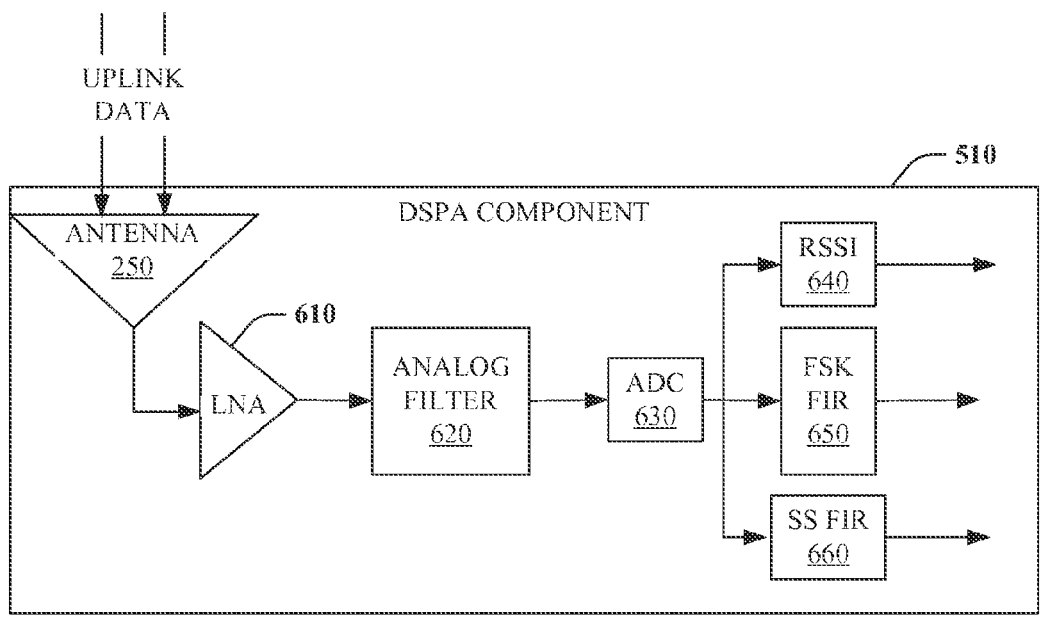
FIG. 6 is an illustration of an embodiment of a DSPA module utilized in the system of FIG. 5.

FIG. 6 is an illustration of an embodiment of the Digital Signal Processing Analysis (DSPA) component 510. The DSPA component 510 can include the uplink receiver antenna 250 (see FIG. 2). The uplink receiver antenna can be configured to receive the first signal and the SS signal (attenuated) via the uplink communication. The first signal and the SS signal (attenuated) can be passed through a low noise amplifier 610 (LNA) portion of the DSPA component, and subsequently an analog filter 620 portion of the DSPA component. The filtered first signal and the SS signal can be passed by an Analog-to-Digital Converter (ADC) 630 portion of the DSPA component. Once the signals (e.g., the first signal and the SS signal) are converted, an RSSI 640 measures a received signal strength (e.g., Received Signal Strength Indicator (RSSI)), a FSK FIR 650 employs Frequency Shift Keying (FSK) with a Finite Impulse Response (FIR), and a SS FIR 660 employs spread spectrum Finite Impulse Response (FIR). The FSK FIR can provide FSK demodulation and the SS FIR can provide spread spectrum analysis. In an embodiment, the spread spectrum signal is a Direct Sequence-Spread Spectrum signal (DS-SS signal) and the SS FIR can be a DS-SS FIR.

The aforementioned digital signal processing methods utilized by the DSPA component 510 are examples of those that can be utilized with the parallel link communication, and it is to be appreciated and understood that a suitable digital signal processing can be utilized in order to separate the first signal from the SS signal, to identify receipt of the SS signal, and/or to measure an attenuation of the SS signal that is reflected.

The aforementioned systems, modules/components (e.g., transmission module, wayside equipment module, systems 100, 200), and the like have been described with respect to interaction between several modules, components, and/or elements. It should be appreciated that such modules and elements can include those elements or sub-elements specified therein, some of the specified elements or sub-elements, and/or additional elements. Further yet, one or more elements and/or sub-elements may be combined into a single component or single module to provide aggregate functionality. The elements may also interact with one or more other elements not specifically described herein for the sake of brevity, but known by those of skill in the art.

Figure 8:
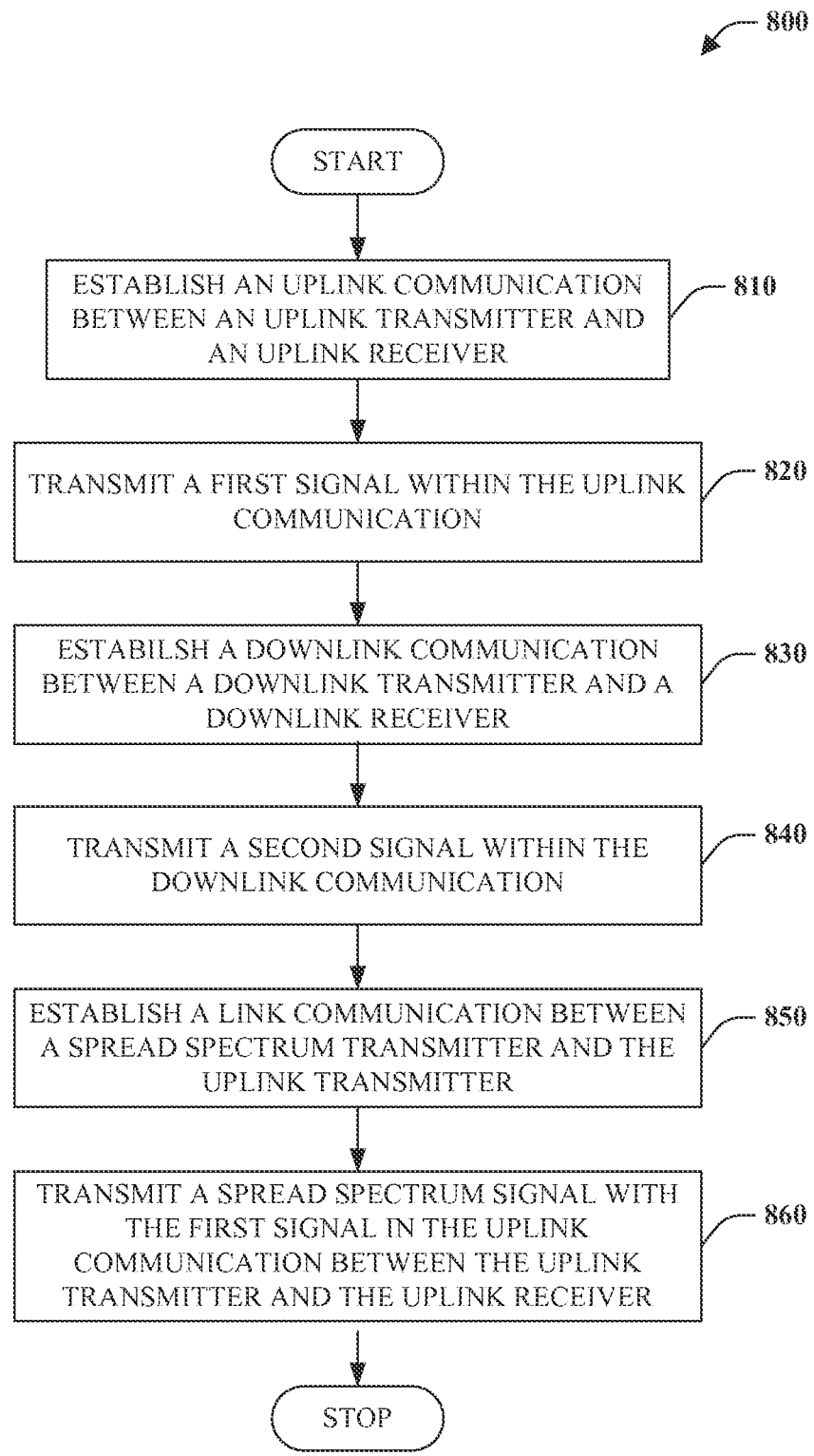
FIG. 8 is a flow chart of an embodiment of a method for creating a parallel link communication.
Figure 9:
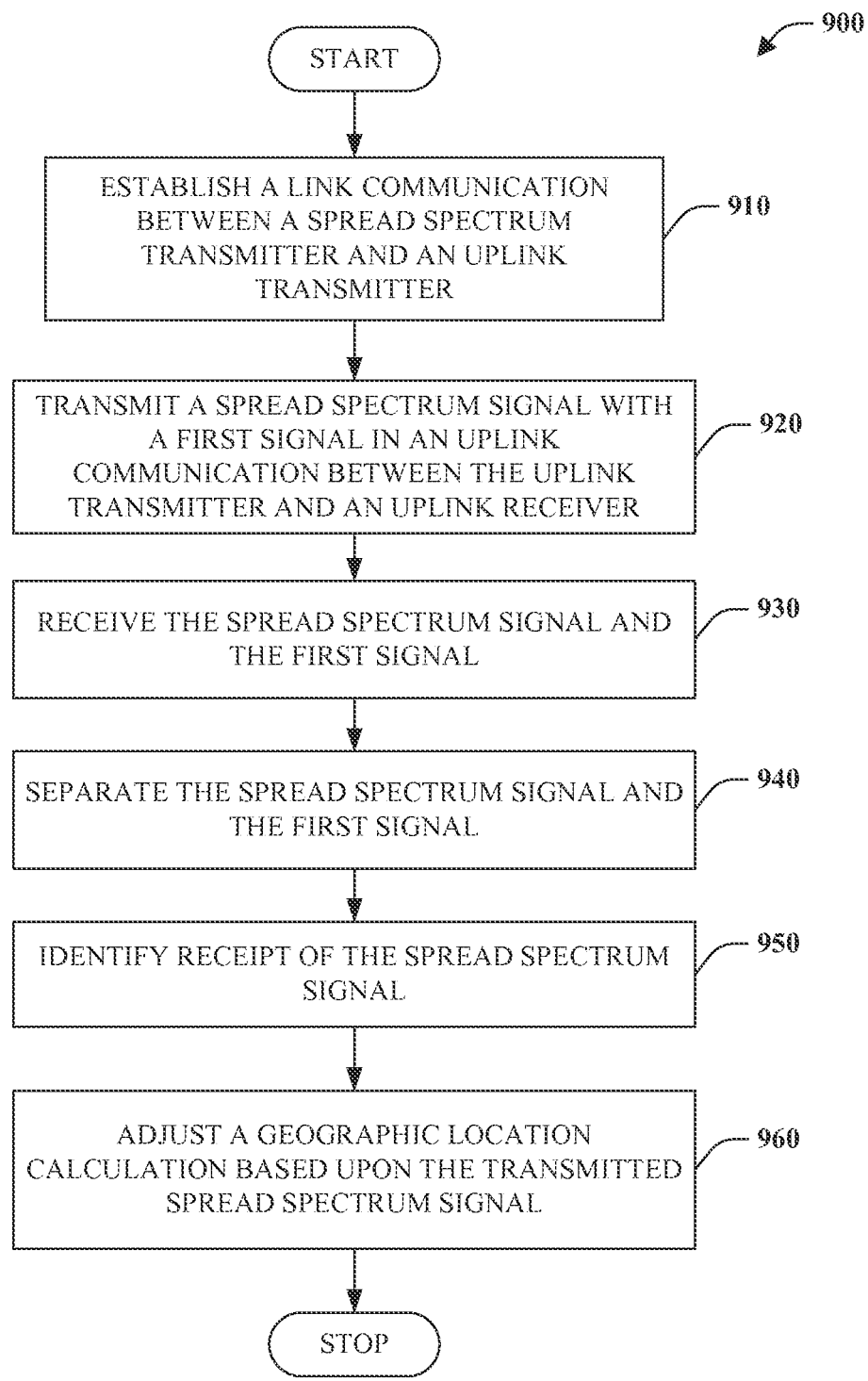
FIG. 9 is a flow chart of an embodiment of a method for adjusting a geographic location based upon a communicated spread spectrum signal.

In view of the exemplary devices and elements described supra, methodologies that may be implemented in accordance with the disclosed subject matter will be better appreciated with reference to the flow charts of FIGS. 8-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates a flow chart of a method 800 for creating a parallel link communication. At reference numeral 810, an uplink communication can be established between an uplink transmitter and an uplink receiver. At reference numeral 820, a first signal can be transmitted within the uplink communication.

At reference numeral 830, a downlink communication can be established between a downlink transmitter and a downlink receiver. At reference numeral 840, a second signal can be transmitted within the downlink communication.

By way of example and not limitation, the uplink communication and the downlink communication can be associated with a transmission module and a wayside equipment module. In another example, the uplink communication and the downlink communication can be between a vehicle balise transmission module and a balise. Yet, the uplink communication and the downlink communication can be between a suitable on-board vehicle and wayside equipment.

At reference numeral 850, a link communication (e.g., also referred to as "parallel link communication") can be established between a spread spectrum transmitter and the uplink transmitter. At reference numeral 860, a spread spectrum signal (SS signal/third signal) can be transmitted with the first signal in the uplink communication between the uplink transmitter and the uplink receiver. For example, the SS signal can be reflected in the uplink communication due to being centered on a frequency associated with the uplink communication and/or the uplink transmitter. The SS signal upon reflection can be received at the uplink receiver. By way of example and not limitation, the SS signal can be a direct sequence spread spectrum (DS-SS) signal. Moreover, the spread spectrum signal reduces an amount of interference with an existing radio signal. Additionally, cross-talk rejection can be employed between a signal from the uplink communication and a signal from a disparate communication based upon the use of the spread spectrum signal.

FIG. 9 illustrates a flow chart of a method 900 for adjusting a geographic location based upon a communicated spread spectrum signal. At reference numeral 910, a link communication can be established between a spread spectrum transmitter and an uplink transmitter. At reference numeral 920, a spread spectrum signal (SS signal) can be transmitted with a first signal in an uplink communication between the uplink receiver and an uplink receiver. For instance, the SS signal can be continuously transmitted.

At reference numeral 930, the spread spectrum signal and the first signal can be received. For instance, the uplink communication can include the first signal and the spread spectrum signal as a contribution in the uplink communication. By way of example and not limitation, the first signal and the spread spectrum signal can be received by a transmission module, a balise transmission module, a vehicle balise transmission module, a transmission module on-board a vehicle, and the like.

At reference numeral 940, the spread spectrum signal can be separated from the first signal. For instance, a digital signal processing analysis can separate the first signal from the spread spectrum signal. For instance, the receipt of the spread spectrum signal at an uplink receiver can be determined. In one example, a low noise amplifier, an analog filter, an Analog-to-Digital Converter, RSSI, FSK FIR, and SS FIR can be employed.

At reference numeral 950, receipt of the spread spectrum signal can be identified. As discussed above, the SS signal is transmitted from a spread spectrum transmitter and reflected by the uplink transmitter to the uplink receiver. The receipt of the SS signal from the uplink communication indicates a reflection from an uplink transmitter.

At reference numeral 960, a geographic location calculation can be adjusted based upon the transmitted and received spread spectrum signal. For example, a geographic location can be communicated or identified based upon the first signal. Moreover, this geographic location can be adjusted based upon the spread spectrum signal, and in particular, the time and location of a receipt of the spread spectrum signal.

Another embodiment relates to a communications method, e.g., a method for communicating between wayside and a vehicle. The method comprises establishing a link communication between a spread spectrum transmitter on board a vehicle and an uplink transmitter that is part of a wayside equipment module. The method further comprises transmitting a spread spectrum signal with a first signal (e.g., concurrent with the first signal) in an uplink communication between the uplink transmitter and an uplink receiver on board the vehicle.

Another embodiment relates to a communication system. The communication system comprises a balise (coupled with a wayside equipment module) that includes an uplink wireless transmitter and a downlink wireless receiver, and a balise transmission module (on board a vehicle) that includes a downlink wireless transmitter and an uplink wireless receiver. The balise and the balise transmission module are configured to establish an uplink channel to communicate a first signal and a downlink channel to communicate a second signal. The balise transmission module further includes a spread spectrum transmitter that is configured to communicate a third signal to the balise for establishing an additional link channel. The balise is configured to communicate the third signal with the first signal (e.g., concurrent with the first signal) to the balise transmission module with the uplink channel.

Another embodiment relates to a communication system. The communication system comprises a balise (coupled with a wayside equipment module) that includes an uplink wireless transmitter and a downlink wireless receiver. The balise is configured to communicate with a balise transmission module to establish an uplink channel to communicate a first signal and a downlink channel to communicate a second signal. The balise is further configured to receive a spread spectrum signal from the balise transmission module, for establishing an additional link channel. The balise is configured to communicate the spread spectrum signal with the first signal (e.g., concurrent with the first signal) to the balise transmission module with the uplink channel.

Another embodiment relates to a communication system. The communication system comprises a balise transmission module (on board a vehicle) that includes a downlink wireless transmitter and an uplink wireless receiver. The balise transmission module is configured to communicate with a balise (coupled with a wayside equipment module) to establish an uplink channel to communicate a first signal and a downlink channel to communicate a second signal. The balise transmission module further includes a spread spectrum transmitter that is configured to communicate a third signal to the balise for establishing an additional link channel. The balise transmission module is further configured to receive the third signal with the first signal (e.g., concurrent with the first signal) from the balise over the uplink channel.

For instance, the geographic data can be a suitable data that can be utilized to identify a geographic position. In another embodiment, the method 900 can include communicating data through the uplink communication related to an indication of an upcoming change in direction for a route. For example, the data can include an upcoming change in direction such as a left turn, a right turn, a series of turns, a combination of a left turn and a right turn, etc. The method 900 can further include communicating data through the uplink communication related to an indication of an upcoming change in elevation for a route. For example, the change in elevation can be uphill, downhill, a banked turn, etc. The method 900 can further include triggering an adjustment to a route a vehicle travels based upon the spread spectrum signal. For instance, a transfer from one route to another route can be employed for a vehicle. By way of example and not limitation, the route change can be for a vehicle to switch from one railway line to another railway line via a switch.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A communication method, comprising:
   establishing a wireless communication between a vehicle and a balise located on or near a rail system on which the vehicle travels, wherein the wireless communication includes a) a downlink communication between at least one antenna of a balise transmission module located on the vehicle and at least one antenna of the balise located on or near the rail system, and b) an uplink communication between the at least one antenna of the balise located on or near the rail system and the at least one antenna of the balise transmission module located on the vehicle;
   establishing a link communication, parallel to the wireless communication, between a spread spectrum transmitter of the balise transmission module located on the vehicle and an uplink transmitter of the balise located on or near the rail system, wherein the link communication includes a continuously transmitted spread spectrum signal;
   and
   retransmitting the spread spectrum signal within the uplink communication from the at least one antenna of the balise located on or near the rail system to the at least one antenna of the balise transmission module located on the vehicle.

2. The method of claim 1, wherein the spread spectrum signal is a direct-sequence spread spectrum (DS-SS) signal.

3. The method of claim 2, wherein the spread spectrum signal reduces an amount of interference with the wireless communication in which the reduction is in relation to a link communication that does not establish the spread spectrum signal.

4. The method of claim 1, further comprising employing cross-talk rejection between a first signal portion of the uplink communication and the spread spectrum signal from the uplink communication and a signal from a disparate communication.

5. The method of claim 1, further comprising receiving the spread spectrum signal.

6. The method of claim 1, further comprising receiving the uplink communication at the balise transmission module located on the vehicle.

7. The method of claim 1, further comprising separating the spread spectrum signal from the uplink communication.

8. The method of claim 1, further comprising measuring attenuation of the spread spectrum signal for the link communication.

9. The method of claim 1, further comprising:
   identifying a geographic location of the balise located on or near the rail system based on data received from the balise located on or near the rail system; and
   adjusting the geographic location calculation based upon a received reflection of the transmitted spread spectrum signal.

10. The method of claim 1, further comprising:
    calculating a geographic location of the vehicle based upon receipt of the uplink communication; and adjusting the calculated geographic location based upon receipt of the spread spectrum signal at the balise transmission module located on the vehicle, wherein the step of adjusting is based upon a delay from the balise located on or near the rail system.

11. The method of claim 1, further comprising identifying a geographic location for the uplink transmitter based upon receipt of the spread spectrum signal at the balise transmission module located on the vehicle.

12. The method of claim 1, further comprising utilizing a center frequency for the spread spectrum transmitter that is within a spectrum of the uplink communication to allow receipt of the spread spectrum signal to communication through the uplink communication.

13. The method of claim 1, further comprising triggering an adjustment to a route the vehicle travels based upon receipt of the spread spectrum signal by the balise transmission module located on the vehicle.

14. The method of claim 1, further comprising triggering an adjustment to a trajectory of the vehicle based upon receipt of the spread spectrum signal by the balise transmission module located on the vehicle.

15. A system, comprising,
a vehicle that is configured to travel on a rail system;
a balise on or near the rail system, the balise includes an uplink wireless transmitter and a downlink wireless receiver;
a balise transmission module located on the vehicle that includes a downlink wireless transmitter and an uplink wireless receiver;
wherein the balise on or near the rail system and the balise transmission module on the vehicle are configured to establish an uplink channel to communicate a first signal from the uplink wireless transmitter to the uplink wireless receiver and a downlink channel to communicate a second signal from the downlink wireless transmitter to the downlink wireless receiver;
wherein the balise transmission module located on the vehicle further includes a spread spectrum transmitter that is configured to continuously communicate a third signal that is received by the balise located on or near the rail system for establishing an additional link channel; and
wherein the uplink wireless transmitter of the balise located on or near the rail system is configured to reflect the third signal within the first signal to the uplink wireless receiver of the balise transmission module located on the vehicle within the uplink channel.

16. The system of claim 15, further comprising:
a first component configured to calculate a geographic location for the vehicle based upon receipt of the first signal; and
a second component configured to provide a more accurate indication of the geographic location of the vehicle based upon receipt of the third signal.

17. The system of claim 15, further comprising a third component configured to adjust a trajectory of the vehicle based upon receipt of the third signal and receipt of the first signal received at the balise transmission module located on the vehicle.

18. A system, comprising:
a transmission module on a vehicle configured to move on a rail system, wherein the vehicle includes at least one first transmitter and at least one first receiver;
a spread spectrum transmission module on the vehicle that is configured to continuously transmit a spread spectrum signal; and
a wayside equipment module on or near the rail system that includes at least one second transmitter and at least one second receiver;
wherein the transmission module on the vehicle is configured for communication with the wayside equipment module on or near the rail system when within a range of each other, and wherein the communication includes the following:
a downlink that includes a first wireless transmission from the transmission module to the wayside equipment module;
an uplink that includes a second wireless transmission from an antenna located on or in the wayside equipment to the transmission module; and
a parallel link that is established when the vehicle is within the range of the wayside equipment module, wherein the parallel link includes the spread spectrum signal that is reflected by the antenna from the wayside equipment module to the vehicle in the uplink.

* * * * *